United States Patent [19]

Sugimoto

[11] Patent Number: 5,924,525
[45] Date of Patent: Jul. 20, 1999

[54] BICYCLE BRAKE ASSEMBLY

[75] Inventor: Masanori Sugimoto, Osakasayama, Japan

[73] Assignee: Shimano Inc., Osaka, Japan

[21] Appl. No.: 08/834,460

[22] Filed: Apr. 16, 1997

[51] Int. Cl.⁶ .................................................. B62L 1/14
[52] U.S. Cl. ..................... 188/24.21; 188/24.21; 188/24.11
[58] Field of Search ............... 188/24.11, 24.12, 188/24.19, 24.21, 210

[56] References Cited

U.S. PATENT DOCUMENTS

| | | | |
|---|---|---|---|
| 4,391,352 | 7/1983 | Brown | 188/24.22 |
| 4,391,353 | 7/1983 | Mathauser | 188/24.22 |
| 4,632,225 | 12/1986 | Mathauser | 188/24.18 |
| 4,765,443 | 8/1988 | Cunningham | 188/24.21 |
| 4,869,351 | 9/1989 | Romano | 188/24.21 |
| 5,499,699 | 3/1996 | Chen | 188/24.21 |
| 5,562,297 | 10/1996 | Lin | 188/24.21 |
| 5,636,716 | 6/1997 | Sugimoto et al. | 188/24.19 |
| 5,743,284 | 4/1998 | Lumpkin | 188/24.12 |

FOREIGN PATENT DOCUMENTS

| | | | |
|---|---|---|---|
| 9405645 | 7/1994 | Germany . | |
| 55-99988 | 7/1980 | Japan . | |
| 314463 | 3/1991 | Japan . | |
| 166246 | 8/1991 | Taiwan . | |
| 274271 | 4/1996 | Taiwan . | |
| 412346 | 6/1934 | United Kingdom | 188/24.21 |
| 420844 | 12/1934 | United Kingdom | 188/24.22 |
| 450429 | 7/1936 | United Kingdom . | |

OTHER PUBLICATIONS

*MTB Super Selection II*, four pages, including pp. 110, 111 and 133; 1996.

For Bikers Only, *Cycle Sports;* Three pages, including pp. 22–23; 1997.

*Suntour;* Taiwan Sakae Ringyo Co., Ltd.; six pages; Nov. 1996.

*Rose 1990/91 Catalog;* Campagnolo; Record Corsa and Croce d'aune; four pages.

*Primary Examiner*—Matthew C. Graham
*Attorney, Agent, or Firm*—Shinjyu Global IP Counselors, LLP

[57] ABSTRACT

A bicycle brake assembly is disclosed for coupling a bicycle brake device onto either front or rear forks of a bicycle by a brake fixing mechanism. The brake fixing mechanism has a fixing member or plate fixedly coupled to either the front or rear forks and a bracing member or plate coupled to the fixing member such that the bicycle brake device is pivotally coupled between the fixing member and the bracing member. Preferably, the brake device is a cantilever brake with its pivot pins interconnecting the fixing member and the bracing member.

26 Claims, 7 Drawing Sheets

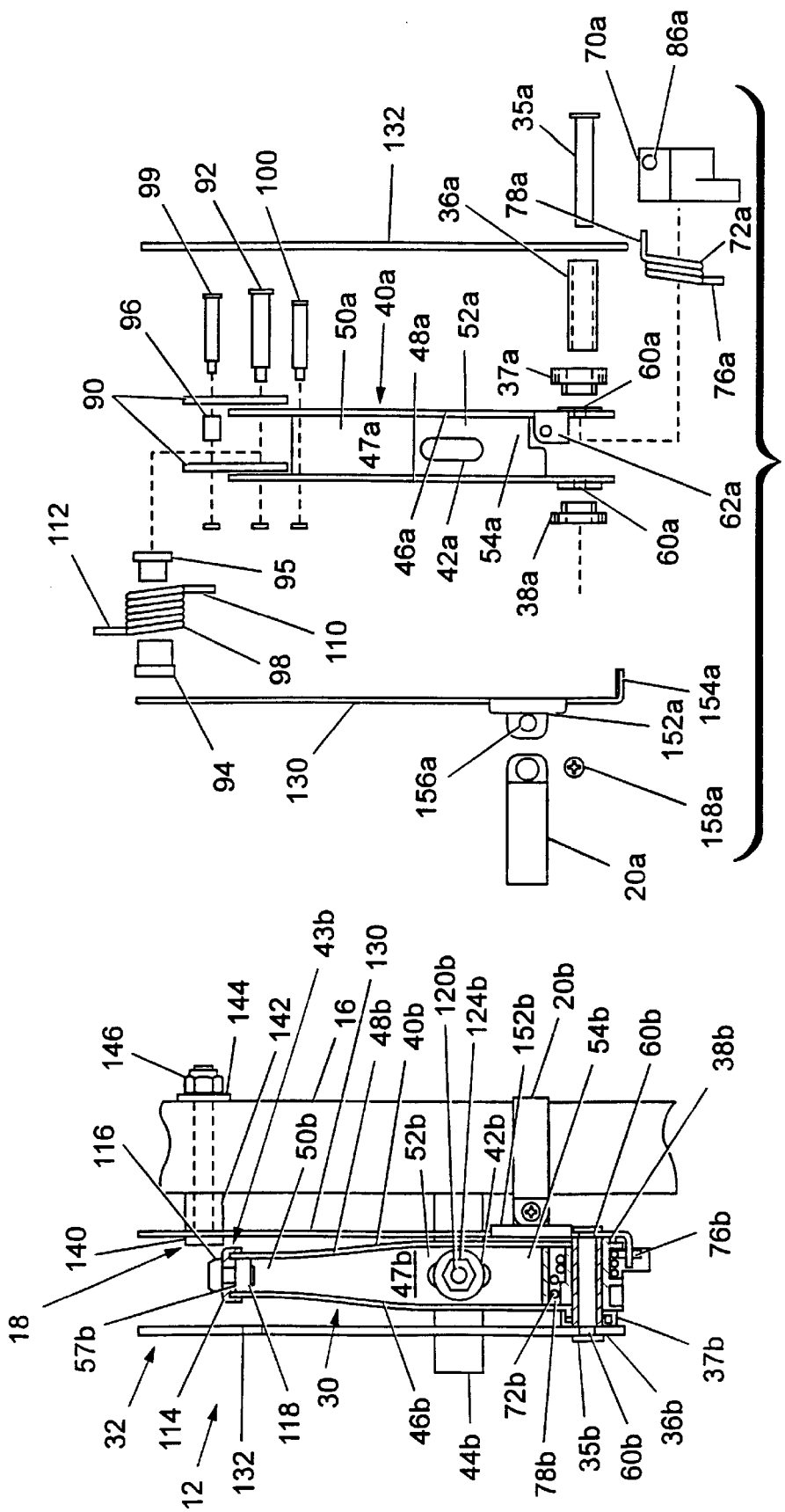

BICYCLE BRAKE ASSEMBLY

FIELD OF THE INVENTION

The present invention generally relates to a brake assembly for bicycles. More specifically, the present invention relates to a brake fixing mechanism for coupling a bicycle brake device onto either front or rear forks of a bicycle so that the brake shoes of the brake device are pressed against the rim of the corresponding wheel upon actuation of a brake operating device.

BACKGROUND OF THE INVENTION

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles which has been extensively redesigned over the past years is the bicycle brake device.

There are several types of bicycle brake devices which are currently available on the market. Examples of some types of common bicycle brake devices include rim brakes and caliper brakes. With respect to caliper brakes, there are mainly three types of caliper brakes: a side pull type, a center pull type and cantilever type. In a side pull type of caliper brake device, a pair of brake arms are pivotally connected together about a center mounting bolt which attaches to the frame of the bicycle. Each of the brake arms has a lever portion which is coupled to the brake wire such that when the rider operates the brake lever of the brake operating device, the lever portions of the brake arms are pulled together, which in turn moves the brake shoes attached to the other ends of the brake arms together against the rim of the bicycle wheel. A return spring is provided for biasing the brake arms away from the bicycle wheel rim when the rider releases the brake lever.

A center pull type of caliper brake device operates similar to the side pull type, except that the brake arms are attached to a brake arm bridge such that each brake arm is pivotally coupled at a separate pivot point on the brake arm bridge. The brake arm bridge is attached directly to the frame of the bicycle. A straddle cable interconnects the two lever portions of the brake arm such that a main brake wire which is coupled to the straddle wire for pulling the lever portions of the brake arm together.

A cantilever type of brake device is generally mounted on bicycle designs for off road use such as mountain bikes (MTB) and all terrain bikes (ATB). In particular, a cantilever type brake device is designed to provide a powerful braking force. A cantilever type of brake device is equipped with a pair of brake arms which are rotatably supported in a cantilever fashion on the front or rear fork of the bicycle frame, with the brake shoes attached to the middle or upper portion of the brake arms. Typically, the lower end of the brake arms are rotatably supported on the bicycle frame and the upper end is linked to a brake cable or wire. The brake shoes are arranged opposite one another on either side of the bicycle wheel rim which is located between the arms. With this cantilever type of brake device, the bicycle arms rotate in the closing direction when the brake cable is pulled by the brake lever, which in turn results in the brake shoes being pressed against the rim to apply a braking force.

With such a cantilever brake device, there is no need to vary the shape of the device with the size of the bicycle as may be the case with a side pull type caliper type brake device. Moreover, cantilever type of brake devices apply a more equal braking force than a side pull type caliper brake. However, one disadvantage of a conventional cantilever type brake is that the locations of the brake arms are fixed to pivot pins which are welded to the frame. Thus, the dimensions of the pivot pins can vary depending upon the frame design. Moreover, the accuracy of the welding of the pivot pin to the bicycle frame often varies depending upon the quality of the bicycle frame. This will affect the performance of the brake device.

In view of the above, there exists a need for a brake device which is less frame dependent than prior brake devices and provides sufficient rigidity and braking force. This invention addresses this need in the art as well as other needs in the art which will become apparent to those skilled in the art from this disclosure.

SUMMARY OF THE INVENTION

One object of the present invention is to provide a brake device which attaches to the bicycle frame by a center mounting bolt.

Another object of the present invention is to provide a brake device which has a constant lateral dimension between the pivot points of the brake arms.

Still another object of the present invention is to provide a brake device which is light weight and relatively inexpensive to manufacture.

Yet another object of the present invention is to provide a brake device which is adjustably mounted to the frame of the bicycle to obtain the desired brake arch ratio.

The foregoing objects can basically be attained by providing a bicycle brake assembly for attachment to a portion of a bicycle frame, comprising a pair of brake arms with each of the brake arms having an upper end, a lower end and a pivot point; a pair of shoe attachment portions coupled to the brake arms, respectively, at locations spaced from the pivot points of the brake arms; a fixing member adapted to be coupled to the bicycle frame, the fixing member having a center portion and a pair of leg portions extending therefrom, the leg portions being pivotally coupled to the pivot points of the brake arms, respectively; and a substantially U-shaped bracing member having a pair of free ends with the brake arms pivotally coupled thereto at the pivot points of the brake arms, respectively, such that the brake arms are located between the fixing member and the bracing member.

The foregoing objects can also be attained by a bicycle brake assembly for attachment to a portion of a bicycle frame, comprising a brake device having a pair of brake arms with a pair of shoe attachment portions coupled thereto; and a brake fixing mechanism coupled to the brake device, and having a fixing member and a U-shaped bracing member with the fixing member being adapted to be coupled to the bicycle frame via at least one coupling member, the brake arms being movably supported between the fixing member and the bracing member.

It will be apparent to those skilled in the art that the bicycle brake assembly in accordance with the present invention should not be limited to cantilever type brake devices. Rather, the bicycle brake assembly in accordance with the present invention can be utilized with other types of brake devices such as center pull type caliper brakes and the like. Moreover, the bicycle brake assembly can be coupled to either the front or back forks of the bicycle as needed and/or desired. In addition, the present invention can be adapted for use with other types of brake arms than the ones illustrated herein.

Other objects, advantages and salient features of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form part of this original disclosure:

FIG. 8 is a right side elevational view of the bicycle brake assembly illustrated in FIGS. 2–7, with certain portions broken away for illustrating certain aspects of the present invention;

FIG. 9 is an exploded left side elevational view of the bicycle braking assembly illustrated in FIGS. 2–8;

DETAILED DESCRIPTION OF THE PREFERRED EMBODIMENT

Figure 1:
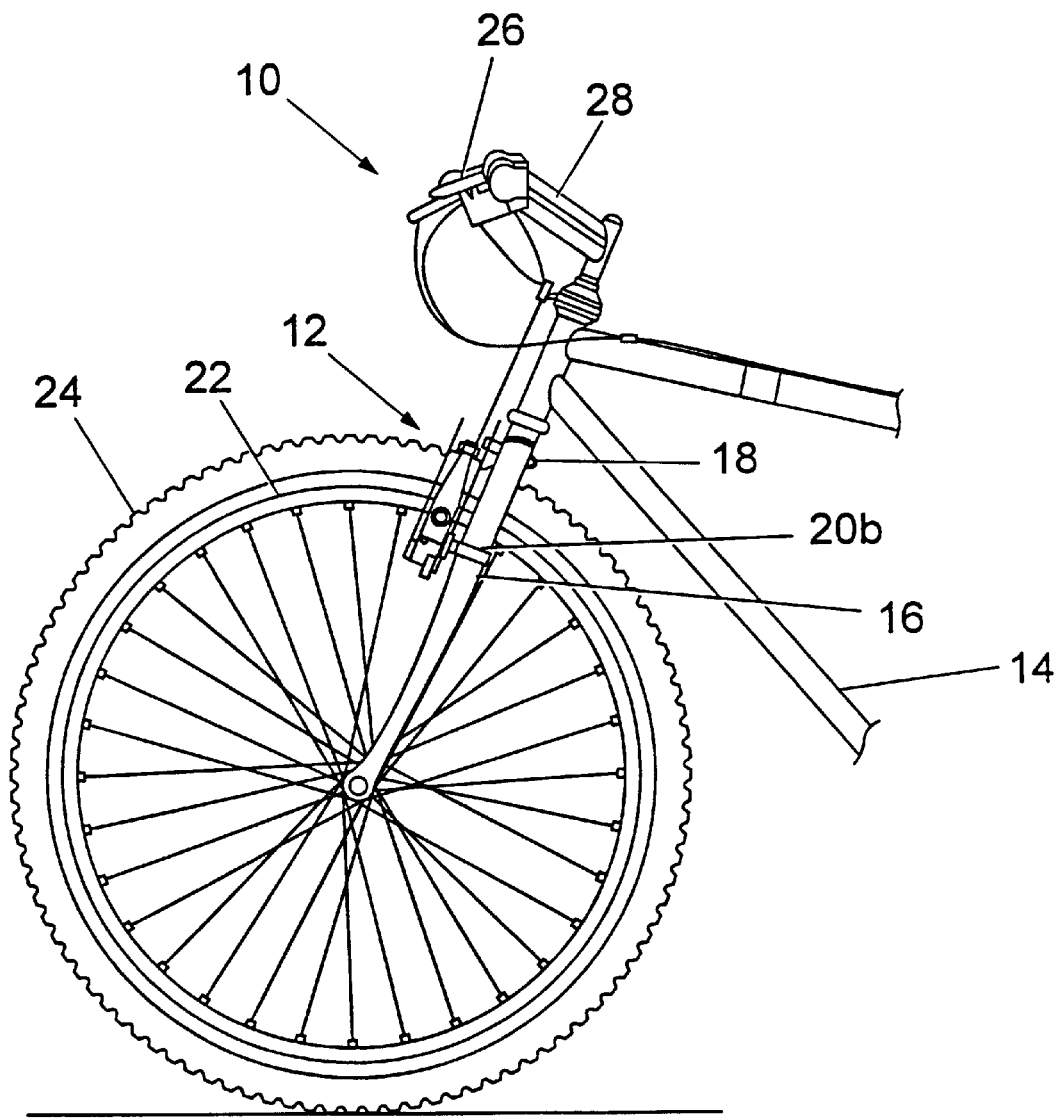
FIG. 1 is a partial, side elevational view of a conventional bicycle using a bicycle brake assembly in accordance with the present invention.

Referring initially to FIG. 1, a conventional bicycle 10 is illustrated having a bicycle brake assembly 12 fixedly coupled to the frame 14 of the bicycle 10. More specifically, bicycle brake assembly 12 is fixedly coupled to front fork 16 of frame 14 via three coupling members 18, 20a and 20b. Coupling members 18, 20a and 20b are designed to allow for adjustment of coupling bicycle brake assembly 12 in relationship to the rim 22 of the bicycle wheel 24 as explained below in more detail.

Bicycle brake assembly 12 is operated in a substantially conventional manner by the rider via a conventional brake operating device or lever 26 which is mounted on the handle bar 28 of bicycle 10 in a conventional manner. Bicycles and their various components are well-known in the prior art, and thus, bicycle 10 and its various components such as brake operating device 26, will not be discussed or illustrated in detail herein.

Bicycle brake assembly 12 basically includes a brake device 30 for engaging and applying a braking force against rim 22 of bicycle wheel 24, and a brake fixing mechanism 32 for coupling brake device 30 to frame 14 via coupling members 18, 20a and 20b. While bicycle brake assembly 12 is illustrated as being coupled to front fork 16 of bicycle frame 14, it will be apparent to those skilled in the art from this disclosure that bicycle brake assembly 12 can be coupled to the rear fork of bicycle frame 14.

Figure 7:
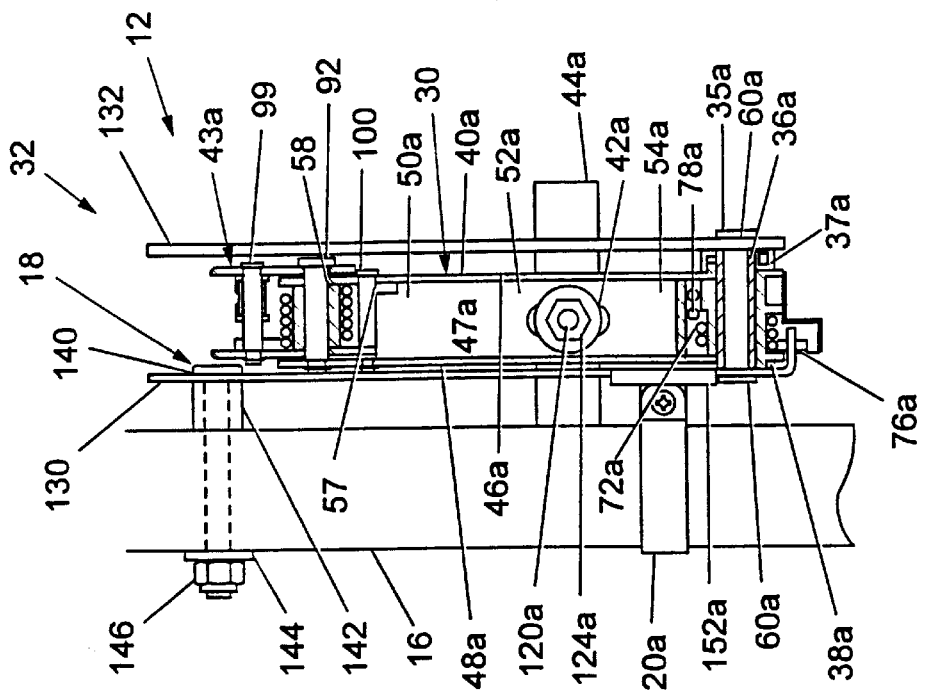
FIG. 7 is a left side elevational view of the bicycle brake assembly illustrated in FIGS. 2–7, with certain portions broken away to illustrate certain aspects of the present invention.
Figure 6:
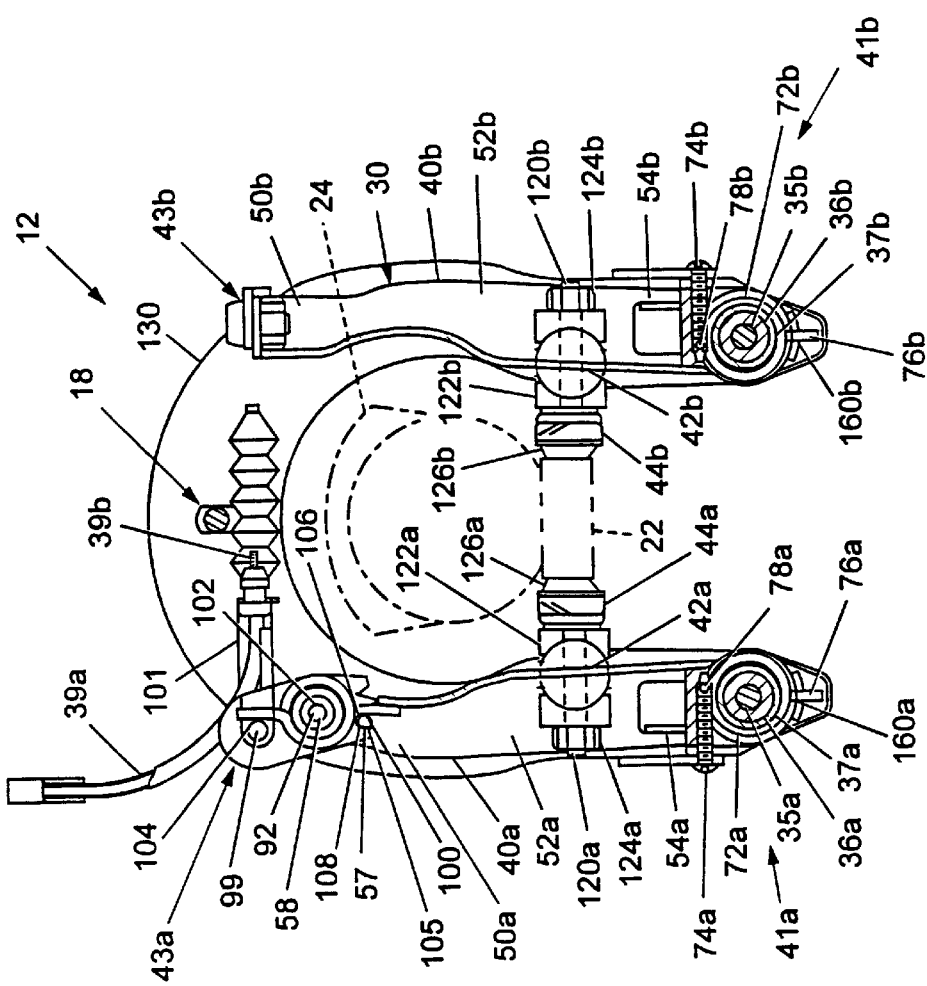
FIG. 6 is a front elevational view of the bicycle brake assembly illustrated in FIGS. 2–5, with the bracing member removed and certain portions of the brake arms broken away for purposes of illustration.

Brake device 30 is pivotally coupled to brake fixing mechanism 32 via a pair of axle assemblies. Each of the axle assemblies are substantially identical. As best seen in FIGS. 6–8, the left assembly includes a pivot pin 35a, a spacing sleeve 36a, a first bushing 37a and a second bushing 38a. Similarly, right axle assemblies has a pivot pin 35b, a spacing sleeve 36b, a first bushing 37b and a second bushing 38b. Preferably, brake device 30 and brake fixing mechanism 32 are coupled together via pivot pins 35a and 35b such that they are secured together as a single unit. Thus, bicycle brake assembly 12 can be sold as a single unit for installation on most bicycles.

Brake device 30 is operatively coupled to brake operating device 26 via a brake cable having an outer casing 39a and inner brake wire 39b. Basically, the rider will operate the brake operating device 26 which in turn will cause brake device 30 to pivot about pivot pins 35a and 35b to apply a braking force against rim 22 of bicycle wheel 24. Upon release of the brake operating device 26, brake device 30 will release rim 22 to allow bicycle wheel 24 to rotate.

Brake device 30 basically includes a pair of brake arms 40a and 40b pivotally coupled to brake fixing mechanism 32 via pivot pins 35a and 35b, a pair of biasing members or return spring assembly 41a and 41b coupled between brake fixing mechanism 32 and brake arms 40a and 40b, a pair of shoe attachment portions 42a and 42b coupled to brake arms 40a and 40b, respectively, a pair of wire mounting portions 43a and 43b coupled to brake arms 40a and 40b, respectively, and a pair of brake shoes 44a and 44b coupled to shoes attachment portions 42a and 42b of brake arms 40a and 40b, respectively.

Figure 10:
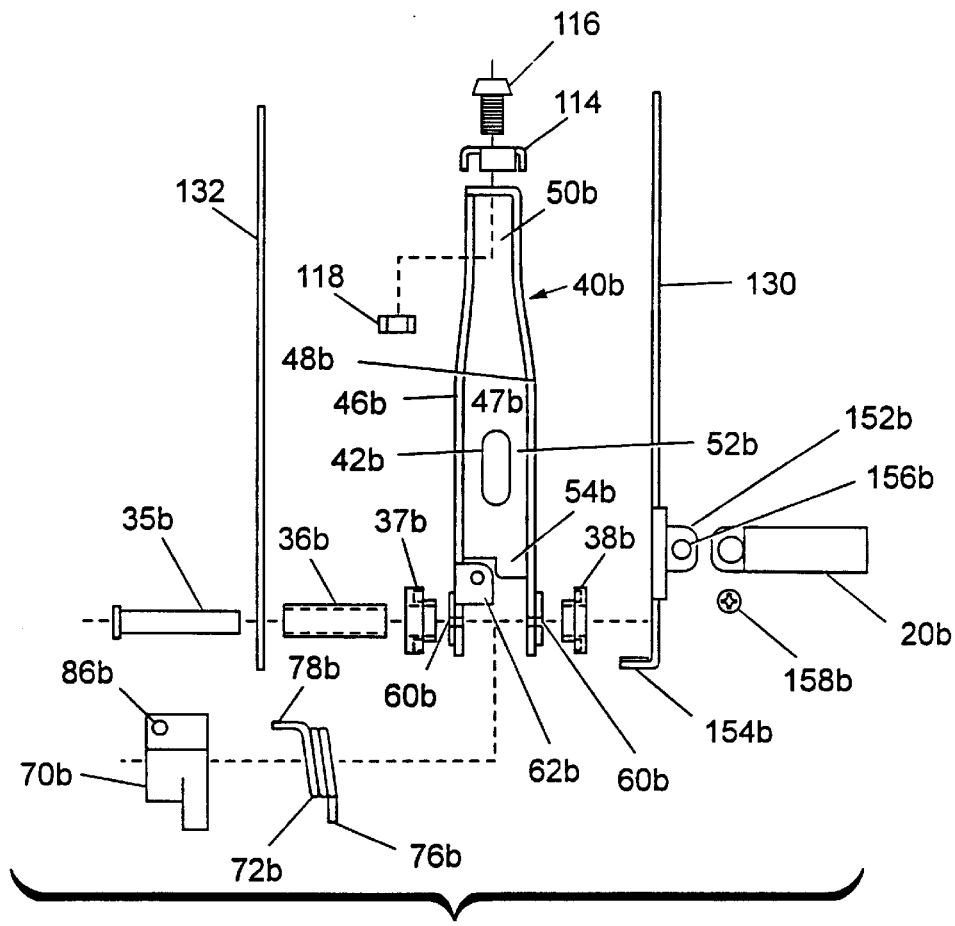
FIG. 10 is an exploded right end elevational view of the bicycle brake assembly illustrated in FIGS. 2–9.

Brake arms 40a and 40b are preferably constructed of a single sheet of metal which is stamped and bent to form the desired shape as seen in FIGS. 7–10. In particular, brake arm 40a has a front wall or plate 46a, a side wall or plate 47a and a rear wall or plate 48a. Front plate 46a and rear plate 48a extend substantially perpendicular to side plate 47a such that brake arm 40a has a substantially U-shaped transverse cross-section. Likewise, brake arm 40b has a front wall or plate 46b, a side wall or plate 47b and a rear wall or plate 48b. Front plate 46b and rear plate 48b extend substantially perpendicular to side plate 47b. The lower ends of front plate 46b and rear plate 48b are substantially parallel to each other at their lower ends, but converge towards each other at their upper ends. Accordingly, brake arms 40a and 40b are substantially identical to each other, except that their upper portions are slightly modified for accommodating attachment portions 44a and 44b, respectively as seen in FIGS. 9 and 10.

While brake arms 40a and 40b are illustrated as being constructed of a rigid sheet metal, it will be apparent to those skilled in the art from this disclosure that brake arms 40a and 40b can be constructed of other suitable materials. For example, the brake arms can be casted or machined from any suitable material such as dense plastic, ceramic, acrylic, etc. Preferably, brake arms 40a and 40b are constructed of a light weight material to minimize the weight of brake assembly 12.

Figure 5:
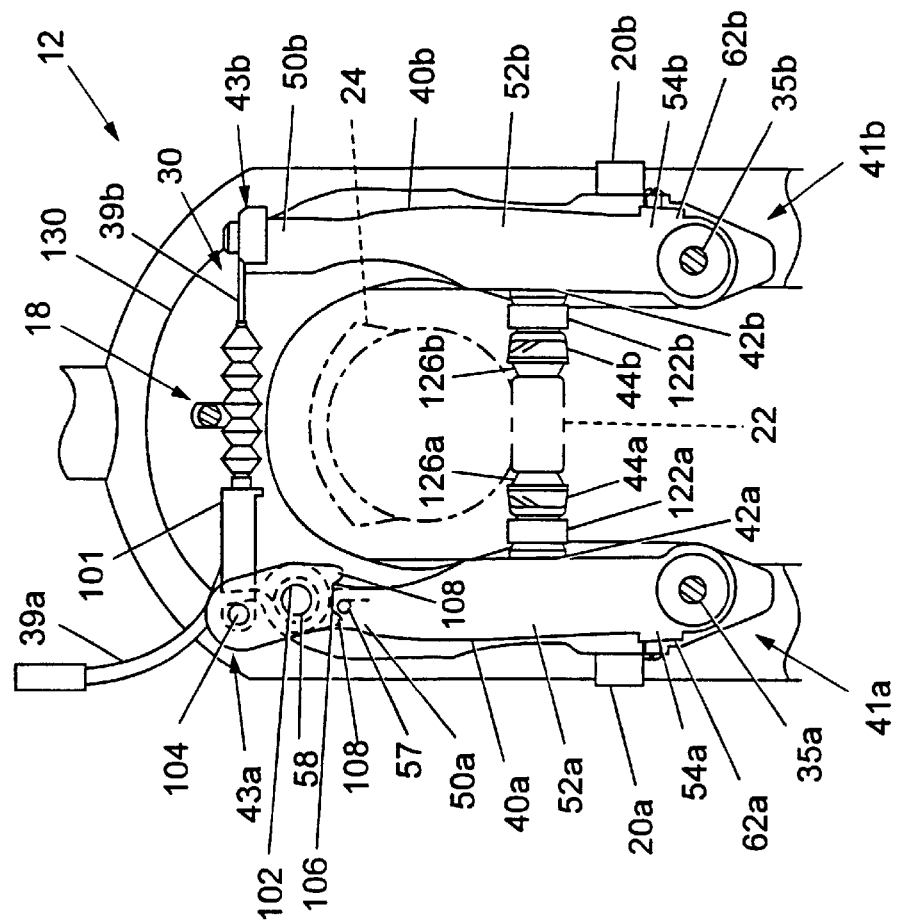
FIG. 5 is a front elevational view of the bicycle brake assembly illustrated in FIGS. 2–4, with the bracing member removed to illustrate the brake arms.
Figure 4:
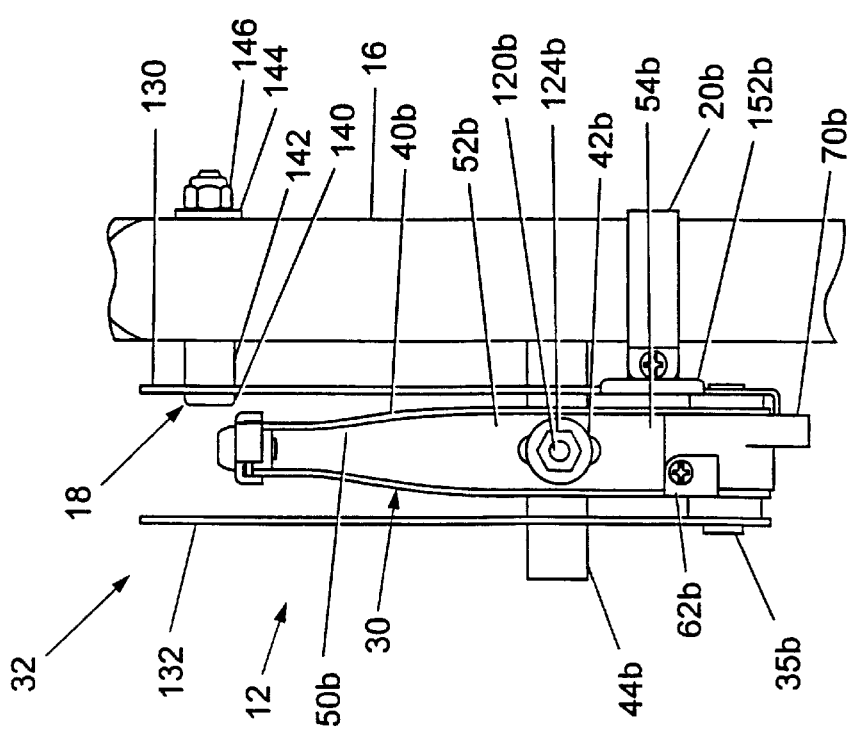
FIG. 4 is a right side elevational view of the bicycle brake assembly illustrated in FIGS. 2 and 3.

Brake arm 40a has an upper end 50a, a center section 52a and a lower end 54a. Upper end 50a of brake arm 40a is coupled to the brake cable via wire mounting portion 43a. Accordingly, the outer casing 39a of the brake cable is attached to brake arm 40a via wire mounting portion 43a such that application of brake operating device 26 causes upper end 50a to move inwardly towards brake arm 40b. Upper end 50a of brake arm 40a is also provided with a pair of attachment holes 57 and 58 for attaching wire mounting portion 43a thereto as seen in FIGS. 5–7. As discussed below, wire mounting portion 43a is pivotally coupled thereto for limited amount of rotational movement relative to brake arm 40a.

The center section 52a of brake arm 40a integrally formed therewith. In par integrally formed therewith. In particular, shoe attachment portion 42a in this embodiment is merely a slot formed within plate 47a of brake arm 40a for attaching brake shoe 44a thereto in a conventional manner as discussed below. Of course, other types of shoe attachment portions can be utilized as needed and/or desired.

Figure 3:
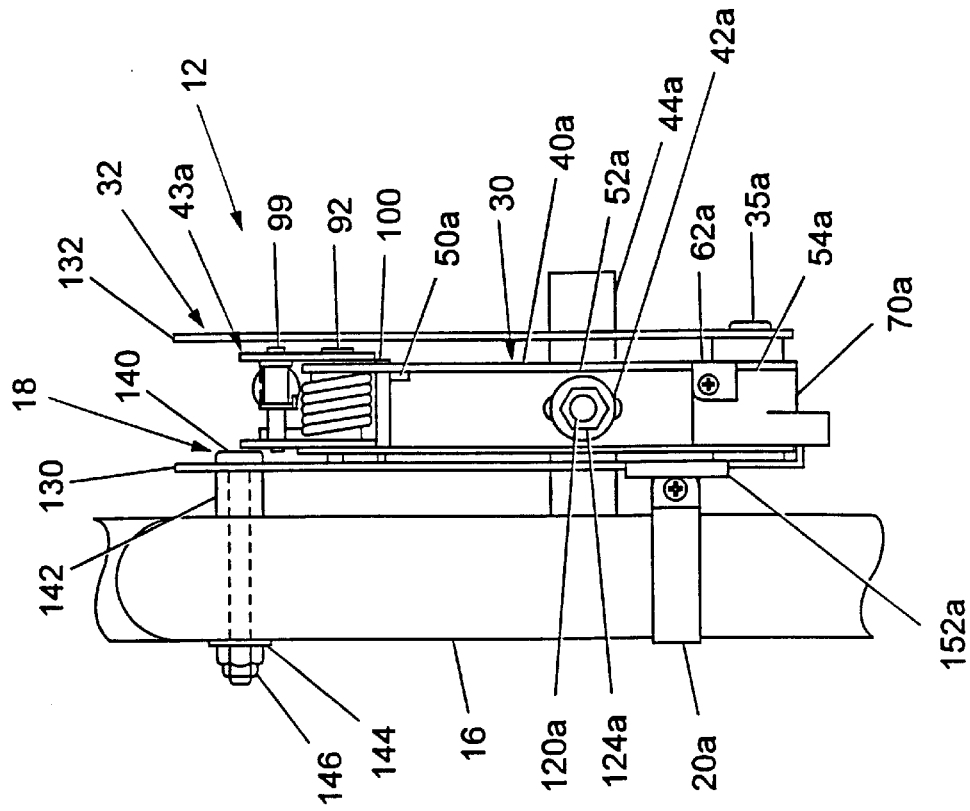
FIG. 3 is a left side elevational view of the bicycle brake assembly illustrated in FIG. 2.
Figure 2:
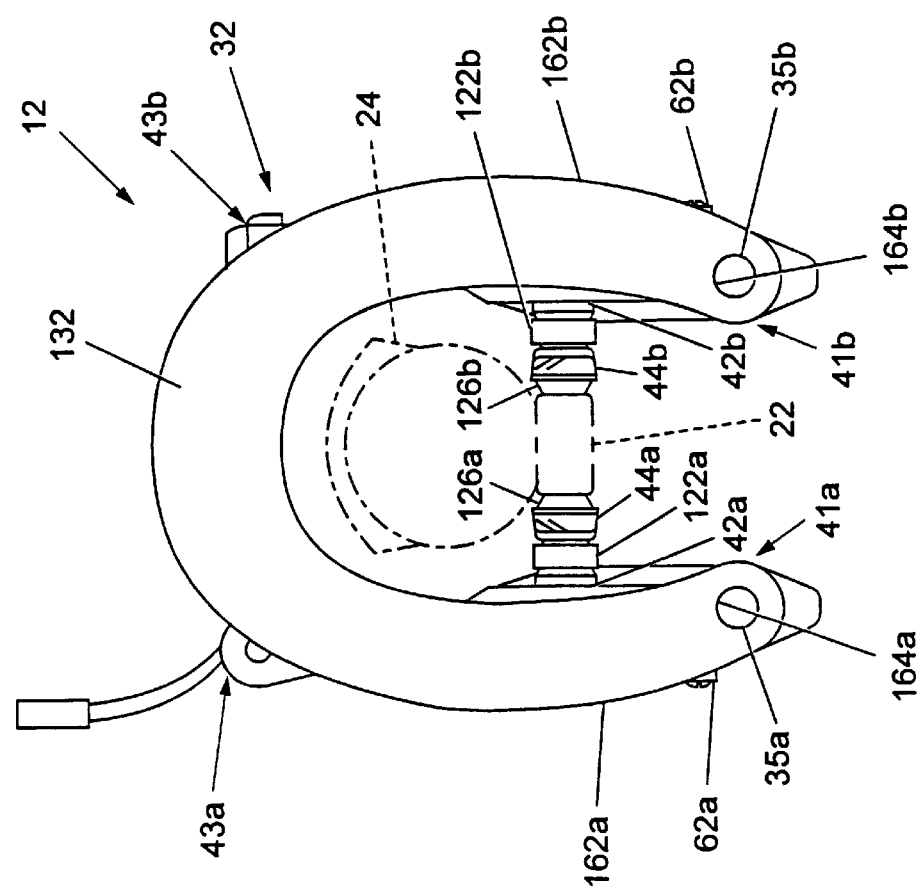
FIG. 2 is a front elevational view of the bicycle brake assembly in accordance with the present invention.

Lower end 54a of brake arm 40a is pivotally coupled to brake fixing mechanism 32 such that brake arm 40a can rotate about a pivot axis formed by pivot pin 35a. More specifically, the lower end 54a of brake arm 40a has a pair of axially aligned pivot holes 60a formed in front plate 46a and rear plate 48a as seen in FIGS. 7 and 9 for receiving pivot pin 35a therein. The lower end 54a of brake arm 40a is also provided with an inwardly extending flange 62a for engaging a part of biasing member 41 a as seen in FIG. 3 to bias brake arm 40a in a counterclockwise direction as seen in FIG. 2 and as discussed below.

Likewise, brake arm 40b has an upper end 50b, a center section 52b and a lower end 54b. Upper end 50b of brake arm 40b is coupled to the brake cable via wire mounting portion 43b. In particular, when the brake operating device 26 is operated, the brake wire 39b of the brake cable pulls the upper end 50b of brake arm 40b inwardly towards brake arm 40a. Upper end 50b of brake arm 40b is provided with a hole 57b for attaching wire mounting portion 43b thereto, and thus, couple the end of brake wire 39b thereto as seen in FIG. 8.

The center section 52b of brake arm 42b has the shoe attachment portion 42b integrally formed therewith. In particular, shoe attachment portion 42b in this embodiment is merely a slot formed within plate 47b of brake arm 40b for attaching brake shoe 44b thereto in a conventional manner.

Lower end 54b of brake arm 40b is pivotally coupled to brake fixing mechanism 32 such that brake arm 40b can rotate about a pivot axis formed by pivot pin 35b. More specifically, the lower end 54b of brake arm 40b has a pair of axially aligned pivot holes 60b formed in front plate 46b and rear plate 48a as seen in FIGS. 8 and 10 for receiving pivot pin 35b therein. The lower end 54b of brake arm 40b is also provided with an inwardly extending flange 62b for engaging a part of biasing member 41b as seen in FIG. 3 to bias brake arm 40b in a clockwise direction as seen in FIG. 2 and as discussed below.

Biasing member 41 a is mounted on pivot pin 35a and engages brake arm 40a and brake fixing mechanism 32. Biasing member 41a includes a casing 70a, a torsion or return spring 72a and an adjustment screw 74a. Casing 70a and return spring 72a are both coaxially mounted on pivot pin 35a and spacing sleeve 36a such that they are located between the front plate 46a and rear plate 48a of brake arm 40a. Biasing member 41 a is designed to normally bias brake arm 40a in a counter-clockwise direction as seen in FIGS. 5 and 6. Accordingly, brake arm 40a is biased by biasing member 41 a such that brake shoe 44a normally moves away from rim 22 of bicycle wheel 24. More specifically, return spring 72a is mounted within casing 70a such that a first end 76a of return spring 72a engages a part of brake fixing mechanism 32 and a second end 78a of return spring 72a engages adjustment screw 74a of biasing member 41 a as seen in FIGS. 6 and 7.

More specifically, casing 70a is provided with a cylindrical recess 80a for receiving the coiled portion of return spring 72a therein, a lower recess 82a for receiving first end 76a of return spring 72a and a portion of brake fixing mechanism 32 therein, and a upper recess 84a for receiving second end 78a of return spring 72a therein. A threaded hole 86a is provided within casing 70a for threadedly receiving adjustment screw 74a therein. Threaded hole 86a is in alignment with the upper recess 84a such that the end of adjustment screw 74a engages the second end 78a of the return spring 72a for adjusting the amount of biasing force applied by return spring 72a between brake arm 40a and brake fixing mechanism 32 for returning brake arm 40a to the disengaged position.

Similar to biasing member 41a, biasing member 41b includes a casing 70b, a torsion or return spring 72b and an adjustment screw 74b. Casing 70b and return spring 72b as seen in FIGS. 6 and 8 are both coaxially mounted on pivot pin 35b and spacing sleeve 36b such that they are located between the front plate 46b and rear plate 48b of break arm 40b. Biasing member 41b is designed to normally bias brake arm 40b in a counter-clockwise direction as seen in FIGS. 5 and 6. Accordingly, brake arm 40b is biased by biasing member 41b such that brake shoe 44b normally moves away from rim 22 of bicycle wheel 24. More specifically, return spring 72b is mounted within casing 70b such that a first end 76b of return spring 72b engages a part of brake fixing mechanism 32 and a second end 78b of return spring 72b engages adjustment screw 74b of biasing member 41b.

Figures 11, 12, 13:
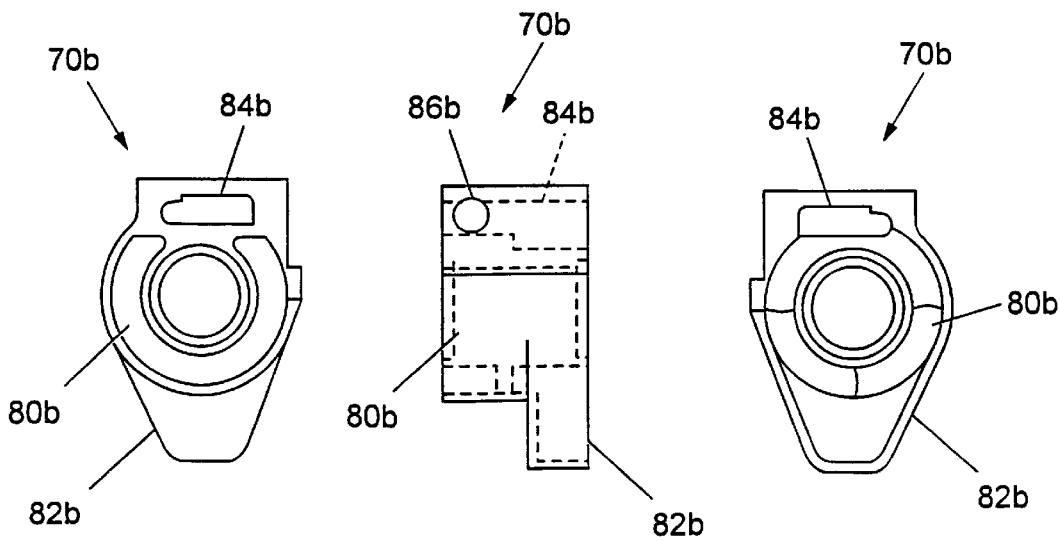
FIG. 11 is an enlarged front end elevational view of one of the casings for the axle assembly of the bicycle brake assembly.
FIG. 12 is an enlarged side elevational view of the casing illustrated in FIG. 11 for the axle assembly of the bicycle brake assembly in accordance with the present invention.
FIG. 13 is an enlarged rear end elevational view of the casing illustrated in FIGS. 11 and 12 for the axle assembly of the bicycle brake assembly in accordance with the present invention.

As seen in FIGS. 11–13, casing 70b is provided with a cylindrical recess 80b for receiving the coiled portion of return spring 72b therein, a lower recess 82b for receiving first end 76b of return spring 72b and a portion of brake fixing mechanism 32 therein, and a upper recess 84b for receiving second end 78b of return spring 72b therein. A threaded hole 86b is provided within casing 70b for threadedly receiving adjustment screw 74b therein. Threaded hole 86b is in alignment with the upper recess 84b such that the end of adjustment screw 74b engages the second end 78b of the return spring 72b for adjusting the amount of biasing force applied by return spring 72b between brake arm 40a and brake fixing mechanism 32 for returning brake arm 40b to the disengaged position.

As seen in FIG. 9, wire mounting portion 43a, which is coupled to brake arm 40a, includes a pair of attachment members or plates 90, a pivot pin 92, a set of bushings 94–96, a torsion spring 98, a connecting pin 99 and a stop pin 100. Basically, wire mounting portion 43a is pivotally coupled to upper end 50a of brake arm 40a via pivot pin 92 which is received through the hole 58 in the upper end 50a of brake arm 40a. More specifically, attachment plates 90 each have a pivot hole 102 formed therein for receiving pivot pin 92 therethrough. One of the attachment plates 90 is positioned adjacent the front plate 46a of brake arm 40a, while the other attachment plate 90 is positioned adjacent the rear plate 48a of brake arm 40a as seen in FIGS. 3 and 7.

Also, each of the attachment plates 90 has a connecting hole 104 for receiving connecting pin 99 therethrough for attaching the brake cable thereto via link 101, and a connecting hole 105 for receiving stop pin 100 therein, as seen in FIGS. 5 and 6. The lower ends of attachment plates 90 are also provided with a slot 106 which forms a pair of stop surfaces 108 for engaging stop pin 100. Accordingly, stop pin 100 cooperates with stop surfaces 108 of slot 106 to limit the amount of rotational movement of attachment plates 90 relative to brake arm 40a. Stop pin 100 is fixedly received within the hole 57 in the upper end 50a of brake arm 40a.

Bushings 94 and 95 are coaxially mounted about pivot pin 92 such that torsion spring 98 is also coaxially mounted about pivot pin 92. Bushings 94 and 95 are designed to maintain proper separation between attachment plates 90, as well as to prevent any interference between the rotational movement of attachment plates 90 relative to torsion spring 98 and/or the upper end 50a of brake arm 40a. Torsion spring 98 has a first end 110 engaging stop pin 100 and a second end 112 for engaging connecting pin 99 such that attachment plates 90 are normally biased in a counterclockwise direction about pivot pin 92 as seen in FIG. 2. Of course, as mentioned above, the left stop surface 108 engages stop pin 100 to limit the rotational movement of attachment plates 90.

Referring now to FIGS. 8 and 10, wire mounting portion 43b has a clamping plate 114, a clamping screw 116 and a clamping nut 18. The wire from the brake cable is received between the upper surface of upper end 50b of brake arm 40b and the lower surface of clamping plate 114 for securing the brake wire therebetween. More specifically, clamping screw 116 is tightened such that clamping plate 114 secures brake wire to the upper end 50b of brake arm 40b. Nut 118 is received between the side walls of brake arm 40b such that rotation of clamping screw 116 will not cause clamping nut 118 to rotate. In other words, the walls of brake arms 40a restrict the movement of nut 118.

Brake shoes 44a are attached to shoe attachment portion or slot 42a such that brake shoe 44a can be adjusted vertically to ensure proper engagement between brake shoe 44a and rim 22 of bicycle wheel 24. Brake shoe 44a has a shoe fastening pin 120a, a shoe holder 122a which is fastened to one end of the shoe fastening pin 120a, a nut 124a threadedly coupled to the free end of shoe fastening pin 120a and a friction pad 126a (constructed of a suitable friction material) which is attached to the shoe holder 122a as seen in FIG. 2.

Brake shoes 44b are attached to shoe attachment portion or slot 42b such that brake shoe 44b can be adjusted vertically to ensure proper engagement between brake shoe 44b and rim 22 of bicycle wheel 24. Brake shoe 44b has a shoe fastening pin 120b, a shoe holder 122b which is fastened to the tip end of the shoe fastening pin 120b, a nut 124b threadedly coupled to the free end of shoe fastening pin 120b and a friction pad 126b (constructed of a suitable friction material) which is attached to the shoe holder 122b as seen in FIG. 2.

Brake fixing mechanism 32 basically includes a fixing member or base plate 130 and a bracing member or booster plate 132. The brake device 30 is fixedly coupled between fixing member 130 and bracing member 132 via pivot pins 35a and 35b such that brake arms 40a and 40b pivot about pivot pins 35a and 35b. As mentioned above, pivot pins 35a and 35b are preferably rivets such that brake device 30 and brake fixing mechanism 32 are coupled together as a single unit. Preferably, fixing member 130 and bracing member 132 are both formed from substantially flat plates of a suitable light weight material. For example, fixing member 130 and bracing member 132 can be constructed of a light weight metallic material such as an aluminum alloy or titanium. Moreover, fixing member 130 and bracing member 132 are both preferably substantially U-shaped members such that they do not interfere with bicycle wheel 24.

Figure 14:
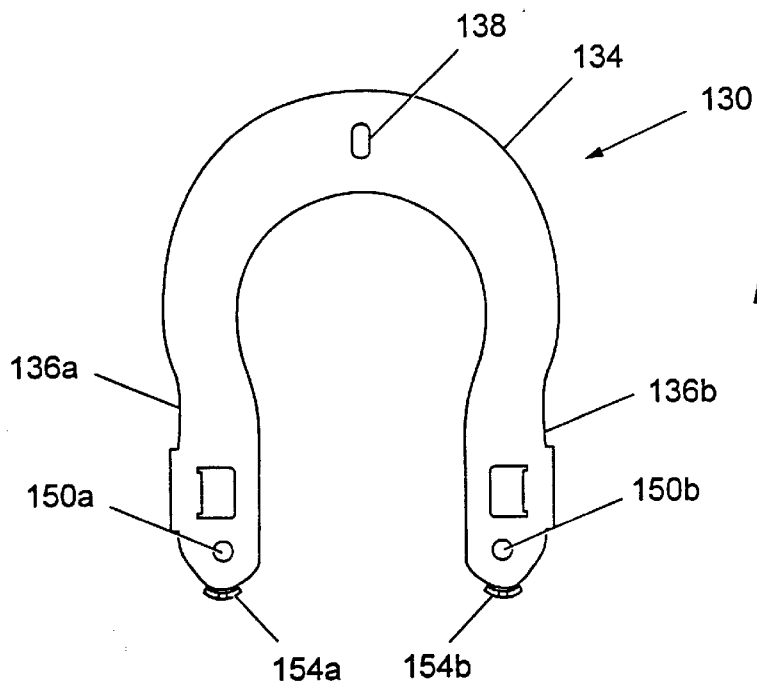
FIG. 14 is a front elevational view of the fixing member for the bicycle brake assembly in accordance with the present invention.
Figure 15:
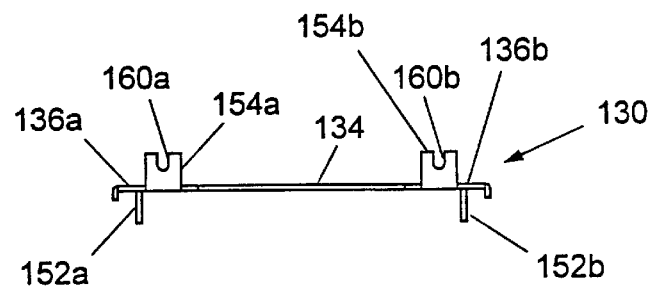
FIG. 15 is a bottom elevational view of the fixing member illustrated in FIG. 14 for the bicycle brake assembly in accordance with the present invention.
Figure 16:
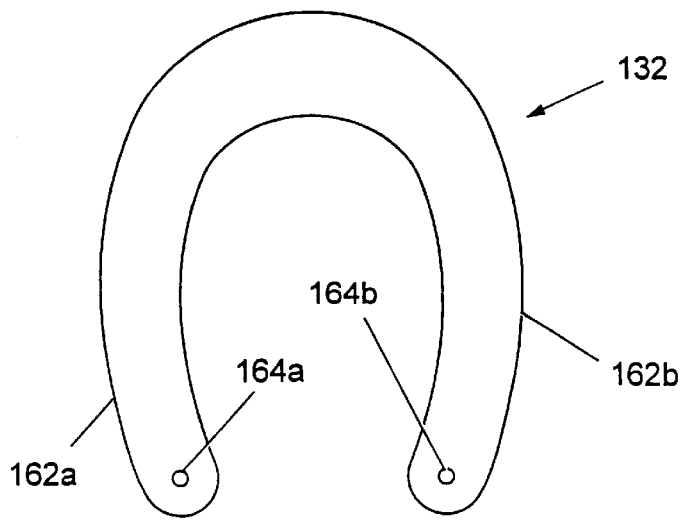
FIG. 16 is a front elevational view of the bracing member for the bicycle brake assembly in accordance with the present invention.

Referring specifically to FIGS. 14 and 15, fixing member 130 has a center portion 134 and a pair of leg portions 136a and 136b. Center portion 134 is provided with a vertically arranged slot 138 for coupling fixing member 130 to the front fork 16 of the bicycle frame via coupling member 18. Preferably, coupling member 18 is a conventional center pivot pin having a bolt 140, a spacer sleeve 142, a washer 144 and a lock nut 146. Of course, it will be apparent to those skilled in the art from this disclosure that other types of fasteners may be used. Accordingly, fixing member 130 can be adjusted vertically relative to the front forks via slot 138.

Leg portion 136a is fixedly coupled to lower end 54a of brake arm 40a via pivot pin 35a, while second leg portion 136b is fixedly coupled to lower end 54b of brake arm 40b by pivot pin 35b. Leg portions 136a and 136b are provided with pivot holes 150a and 150b for receiving pivot pins 35a and 35b therein, respectively. Leg portions 136a and 136b each also has a rearwardly extending mounting tab 152a or 152b, and a forwardly extending tab 154a or 154b, respectively.

Mounting tabs 152a and 152b are each provided with a hole 156a and 156b, respectively, for attaching coupling members 20a and 20b thereto. More specifically, coupling members 20a and 20b are preferably band clamps with fastening screws 158a and 158b threadedly received in holes 156a and 156b of mounting tabs 152a and 152b to secure leg portion 136a and 136b of fixing member 130 to a part of the fork 16 of the bicycle frame.

Tab 154a extends forwardly from the bottom free end of leg portion 136a such that it extends substantially perpendicular to the plane of fixing member 130. Tab 154a has a slot 160a for receiving the first end 76a of return spring 72a such that first end 76a of return spring 72a applies a biasing force against tab 154a to bias the brake shoe 44a of brake arm 40a away from rim 22 of bicycle wheel 24. In particular, tab 154a extends into lower recess 82a of casing 70a to engage first end 76a of return spring 72a. Likewise, tab 154b extends forwardly from the bottom free end of leg portion 136b such that it extends substantially perpendicular to the plane of fixing member 130. Tab 154b has a slot 160b for receiving the first end 76b of return spring 72b such that first end 76b of return spring 72b applies a biasing force against tab 154b to bias the brake shoe 44b of brake arm 40b away from rim 22 of bicycle wheel 24. In particular, tab 154b extends into lower recess 82b of casing 70b for engaging first end 76b of return spring 72b.

Bracing member 132 is substantially U-shaped as mentioned above, and has a pair of free ends 162a and 162b. Free end 162a is provided with a hole 164a for receiving pivot pin 35a therein, while free end 162b has a hole 164b for receiving pivot pin 35b therein. As mentioned above, pivot pins 35a and 35b are rivets such that bracing member 132 is fixedly coupled to fixing member 130 via pivot pins or rivets 35a and 35b. Since pivot pins 35a and 35b are fixedly coupled at one end via fixing member 130 and fixedly coupled at the other end via bracing member 132, brake arms 40a and 40b of brake device 30 are securely supported therebetween.

Since coupling members 20a and 20b are not fixed to the fork, fixing plate 130 can be coupled to a wide variety of bicycles. Moreover, the brake arch ratio of the brake arms 40a and 40b can remain constant.

In operation, when the rider operates the brake lever of the brake operating device 30, the inner wire of the brake cable is pulled within the outer casing of the brake cable so that the upper ends 50a and 50b of brake arms 40a and 40b are pulled inwardly. Thereafter, the friction pads 126a and 126b on the brake shoe holders or pad supports 122a or 122b are pressed against the side surfaces of rim 22, thus causing a braking action to be performed. In other words, brake arm 40a rotates in a clockwise direction about pivot pin 35a against the force of return spring 72a and brake arm 40b rotates in a counter clockwise direction about pivot pin 35b against the force of return spring 72a. Once the rider releases the brake lever of the brake operating device 30, the brake wire 39b of the brake cable is relaxed so that the return springs 72a and 72b within the brake arms 40a and 40b cause the brake arms 40a and 40b to pivot in the opening direction. As a result, the tip ends of the friction pads 126a and 126b on the brake shoe holders 122a and 122b are withdrawn from the side surfaces of rim 22 so that the braking action is released.

While only one embodiment of the present invention has been described and illustrated herein, it will be apparent to those skilled in the art once given this disclosure that various modifications, changes, improvements and variations may be made without departing from the spirit or scope of this invention as defined in the following claims.

What is claimed is:

1. A bicycle brake assembly for attachment to a portion of a bicycle frame, comprising:
    a pair of brake arms with each of said brake arms having an upper end, a lower end and a pivot point with a pivot pin passing through each of said brake arms;
    a pair of shoe attachment portions coupled to said brake arms, respectively, at locations spaced from said pivot points of said brake arms;
    a fixing member adapted to be coupled to the bicycle frame by at least one coupling element, said fixing member having a center portion and a pair of leg portions extending therefrom, said brake arms being pivotally coupled at said pivot points of said brake arms to said leg portions by said pivot pins, respectively; and
    a substantially U-shaped bracing member having a pair of free ends with said brake arms pivotally coupled thereto at said pivot points of said brake arms by said pivot pins, respectively, such that said brake arms are pivotally located between said fixing member and said bracing member,
    said pivot pins being fasteners which fixedly secure said brake arms, said fixing member and said bracing member together to form a single attachable unit that is separate from the bicycle frame and that is adapted to be adjustably mounted to the bicycle frame via said at least one coupling element.

2. A bicycle brake assembly according to claim 1, wherein said center portion of said fixing member has a vertical slot with said coupling element extending therethrough.

3. A bicycle brake assembly according to claim 2, wherein said coupling element is a bolt having a threaded end with a nut threadedly coupled thereto.

4. A bicycle brake assembly according to claim 1, wherein said center portion has a hole formed therein for attachment to the bicycle frame via said coupling element.

5. A bicycle brake assembly according to claim 1, wherein each of said leg portions has said coupling element coupled thereto to adjustably attach said fixing member to the bicycle frame.

6. A bicycle brake assembly according to claim 5, wherein said coupling elements are band clamps.

7. A bicycle brake assembly according to claim 1, wherein said pivot points are located adjacent said lower ends of said brake arms.

8. A bicycle brake assembly according to claim 7, wherein said upper ends of said brake arms are movably coupled together by a brake wire.

9. A bicycle brake assembly according to claim 8, further comprising:
    a biasing member operatively coupled between each of said brake arms and one of said fixing and bracing members to normally bias said shoe attachment portions away from each other.

10. A bicycle brake assembly according to claim 9, wherein
    said biasing members includes a pair of torsion springs.

11. A bicycle brake assembly according to claim 1, wherein
    said fasteners are rivets that engage opposite facing surfaces of said fixing member and said bracing member.

12. A bicycle brake assembly according to claim 1, wherein said pivot pins have a spacing sleeve coaxially mounted thereon to separate said fixing member from said bracing member.

13. A bicycle brake assembly according to claim 12, wherein
    said upper ends of said brake arms are movably coupled together by a brake wire.

14. A bicycle brake assembly according to claim 13, wherein
    a biasing member operatively coupled between each of said brake arms and one of said fixing and bracing members to normally bias said shoe attachment portions away from each other.

15. A bicycle brake assembly according to claim 14, wherein
    said biasing members are torsion springs located on said pivot pins.

16. A bicycle brake assembly according to claim 1, wherein
    said fixing member is a substantially planar plate.

17. A bicycle brake assembly according to claim 1, wherein
    said bracing member is a substantially planar plate.

18. A bicycle brake assembly according to claim 1, wherein a pair of brake shoes are coupled to said shoe attachment portions, respectively.

19. A bicycle brake assembly for attachment to a portion of a bicycle frame, comprising:

a brake device having a pair of brake arms with a pair of shoe attachment portions coupled thereto;

a brake fixing mechanism coupled to said brake device, and having a U-shaped fixing member and a U-shaped bracing member with said fixing member being adapted to be coupled to the bicycle frame via at least one coupling member, said brake arms being movably supported between said fixing member and said bracing member; and a pair of pivot pins extending between said fixing member and said bracing member to pivotally couple said brake arms thereto, said pivot pins being fasteners which fixedly secure said brake arms, said fixing member and said bracing member being together to form a single attachable unit that is separate from the bicycle frame and that is adapted to be adjustably coupled to the bicycle frame via said coupling member, said brake device being a cantilever brake device with said brake arms having lower ends pivotally coupled between said fixing member and bracing member via said pivot pins.

20. A bicycle brake assembly according to claim 19, wherein said pivot pins have a spacing sleeve coaxially mounted thereon to separate said fixing member from said bracing member.

21. A bicycle brake assembly according to claim 20, wherein a biasing member operatively coupled between each of said brake arms and one of said fixing and bracing members to normally bias said shoe attachment portions away from each other.

22. A bicycle brake assembly according to claim 21, wherein said fixing member has a center portion and a pair of leg portions with said coupling element attached to said center portion.

23. A bicycle brake assembly according to claim 22, wherein each of said leg portions has a clamping element coupled thereto to adjustably attach said fixing member to the bicycle frame.

24. A bicycle brake assembly according to claim 19, wherein a pair of brake shoes are coupled to said shoe attachment portions, respectively.

25. A bicycle brake assembly according to claim 19, wherein said fasteners are rivets that engage opposite facing surfaces of said fixing member and said bracing member.

26. A bicycle brake assembly according to claim 19, wherein said brake arms are constructed of a sheet metal material.

* * * * *